United States Patent
Brockhage et al.

(10) Patent No.: US 7,613,840 B2
(45) Date of Patent: Nov. 3, 2009

(54) METHODS AND APPARATUS FOR DYNAMIC DATA ACQUISITION CONFIGURATION PARAMETERS

(75) Inventors: Donald Frank Brockhage, Gardnerville, NV (US); Erik Dylan Evans, Gardnerville, NV (US); Mark Leo Gneiting, Gardnerville, NV (US); Adam Weiss, Minden, NV (US)

(73) Assignee: General Electric Company, Schenectady, NY (US)

( * ) Notice: Subject to any disclaimer, the term of this patent is extended or adjusted under 35 U.S.C. 154(b) by 468 days.

(21) Appl. No.: 11/465,153

(22) Filed: Aug. 17, 2006

(65) Prior Publication Data

US 2008/0043821 A1   Feb. 21, 2008

(51) Int. Cl.
*G06F 3/00* (2006.01)
(52) U.S. Cl. .................................. 710/5; 710/7; 710/20
(58) Field of Classification Search ................ 710/5, 710/7, 20; 726/13; 709/224, 229, 206; 712/10, 712/11; 703/18
See application file for complete search history.

(56) References Cited

U.S. PATENT DOCUMENTS

| | | |
|---|---|---|
| 5,115,432 A | 5/1992 | Haas |
| 5,159,673 A | 10/1992 | Sackmann et al. |
| 5,206,933 A | 4/1993 | Farrell et al. |
| 5,218,680 A | 6/1993 | Farrell et al. |
| 5,261,059 A | 11/1993 | Hedberg et al. |
| 5,287,537 A | 2/1994 | Newmark et al. |
| 5,325,492 A | 6/1994 | Bonevento et al. |
| 6,085,248 A * | 7/2000 | Sambamurthy et al. ..... 709/229 |
| 6,567,846 B1 | 5/2003 | Garg et al. |
| 6,725,281 B1 | 4/2004 | Zintel et al. |
| 6,763,395 B1 | 7/2004 | Austin |
| 6,779,004 B1 | 8/2004 | Zintel |
| 6,892,230 B1 | 5/2005 | Gu et al. |
| 6,892,249 B1 * | 5/2005 | Codilian et al. ................. 710/5 |
| 6,910,068 B2 | 6/2005 | Zintel et al. |
| 7,194,598 B2 * | 3/2007 | Jacob .......................... 712/10 |
| 7,467,202 B2 * | 12/2008 | Savchuk ..................... 709/224 |
| 2002/0029256 A1 | 3/2002 | Zintel et al. |
| 2002/0035621 A1 | 3/2002 | Zintel et al. |
| 2003/0040897 A1 * | 2/2003 | Murphy et al. ................ 703/18 |
| 2004/0030822 A1 | 2/2004 | Rajan et al. |
| 2004/0045007 A1 | 3/2004 | Boland et al. |
| 2004/0260800 A1 | 12/2004 | Gu et al. |
| 2005/0022210 A1 | 1/2005 | Zintel et al. |
| 2005/0074018 A1 | 4/2005 | Zintel et al. |
| 2005/0097503 A1 | 5/2005 | Zintel et al. |
| 2005/0114367 A1 | 5/2005 | Serebrennikov |
| 2005/0166033 A1 * | 7/2005 | Jacob .......................... 712/11 |
| 2005/0193366 A1 | 9/2005 | Boland et al. |
| 2005/0240665 A1 | 10/2005 | Gu et al. |
| 2005/0240993 A1 * | 10/2005 | Treadwell et al. ............. 726/13 |
| 2005/0267935 A1 | 12/2005 | Gandhi et al. |

(Continued)

*Primary Examiner*—Le Luu
(74) *Attorney, Agent, or Firm*—Armstrong Teasdale LLP

(57) ABSTRACT

Methods and apparatus for transmitting data between elements of a data acquisition system are provided. The method includes receiving, at a first element, a self-describing control packet including a first configuration parameter, the first configuration parameter controls first data acquisition by the first element, acquiring first data by the first element in accordance with the first configuration parameter, generating a self-describing data packet including an identifier for the first configuration parameter and the acquired first data, and interpreting the acquired first data using the identifier.

20 Claims, 2 Drawing Sheets

U.S. PATENT DOCUMENTS

2006/0022048 A1    2/2006  Johnson
2006/0143316 A1*   6/2006  Mills et al. .................... 710/5
2006/0168013 A1*   7/2006  Wilson et al. ............... 709/206

* cited by examiner

METHODS AND APPARATUS FOR DYNAMIC DATA ACQUISITION CONFIGURATION PARAMETERS

BACKGROUND OF THE INVENTION

This invention relates generally to data acquisition systems and more particularly, to methods and apparatus for transmitting self-describing data packets to change configuration parameters on the fly.

In at least some known data acquisition systems a detailed description of all electrical hardware and data display parameters is defined prior to actual data acquisition. Typically, such configuration parameters are defined prior to data acquisition, and then remain constant for the duration of data acquisition. Configuration parameters are not typically permitted to change during data acquisition. If the system permits changes to configuration parameters on the fly, it is difficult to correlate acquired data to the set of configuration parameters used while the data was acquired. The difficulty requires significant processing overhead to accomplish. At relatively slow data rates, known processors may be able to process the acquired data and the configuration parameters in use when the data was acquired. However, for data transfer rates commonly in use and for data rates expected in the future, faster methods of correlating data with the configuration parameters in use when the data was acquired are needed. Additionally, configuration and control interfaces generally do not permit configuration parameters to be modified individually.

BRIEF DESCRIPTION OF THE INVENTION

In one embodiment, a method for transmitting data between elements of a data acquisition system includes receiving, at a first element, a self-describing control packet including a first configuration parameter, the first configuration parameter controls first data acquisition by the first element, acquiring first data by the first element in accordance with the first configuration parameter, generating a self-describing data packet including an identifier for the first configuration parameter and the acquired first data, and interpreting the acquired first data using the identifier.

In another embodiment, a data acquisition system includes an interface element configured to receive first configuration parameter information from at least one of a user at said interface element and a software generated rule. The interface element is further configured to generate a self-describing control packet including the received first configuration parameter information, The data acquisition system further includes a first element configured to receive the self-describing control packet and to control acquisition of first data by the first element using the first configuration parameter information, and a second element configured to interpret the acquired first data using the first configuration parameter information.

In yet another embodiment, a computer program embodied on a computer readable medium for controlling data acquisition on a machine includes a code segment that controls a data acquisition system to receive, at a first element, a self-describing control packet including a first configuration parameter, the first configuration parameter controls first data acquisition by the first element. The code segment also controls the data acquisition system to acquire first data by the first element in accordance with the first configuration parameter, generate a self-describing data packet including an identifier for the first configuration parameter and the acquired first data, and interpret the acquired first data using the identifier.

DETAILED DESCRIPTION OF THE INVENTION

Figure 1:
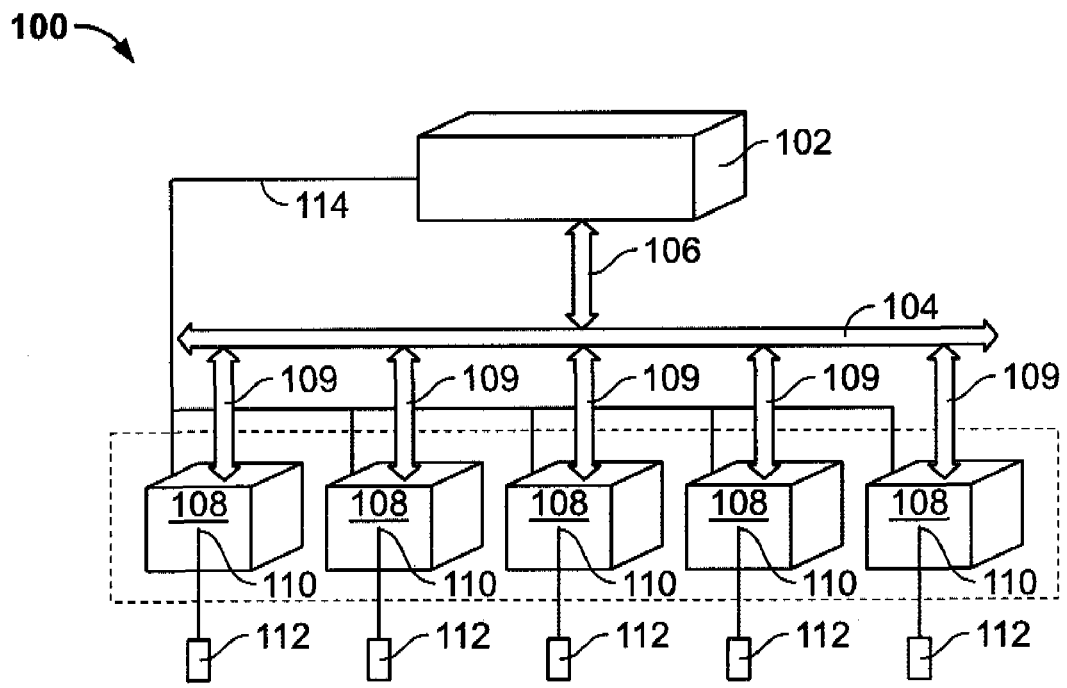
FIG. 1 is a schematic view of an exemplary architecture for a portion of a data acquisition system in accordance with an embodiment of the present invention.

FIG. 1 is a schematic view of an exemplary architecture for a portion of a data acquisition system 100 in accordance with an embodiment of the present invention. Data acquisition system 100 includes a data storage and acquisition element 102 that communicates with other data acquisition system 100 elements through a bus 104, for example, a PCI bus. A data transfer interface 106 facilitates formatting the communicated data in a predetermined protocol on bus 104. A plurality of data source elements 108, such as data acquisition system input cards each communicate through bus 104 with other data acquisition system 100 elements. Each input card 108 includes a PCI bus interface 109 that facilitates formatting the input data in the protocol used on bus 104. Each input card 108 also includes an input connection that is communicatively coupled to a sensor 112 such as a vibration sensor. A configuration and control interface 114 is used to transmit configuration and control messages from data storage and acquisition element 102 to elements communicatively coupled to configuration and control interface 114.

Figure 2:
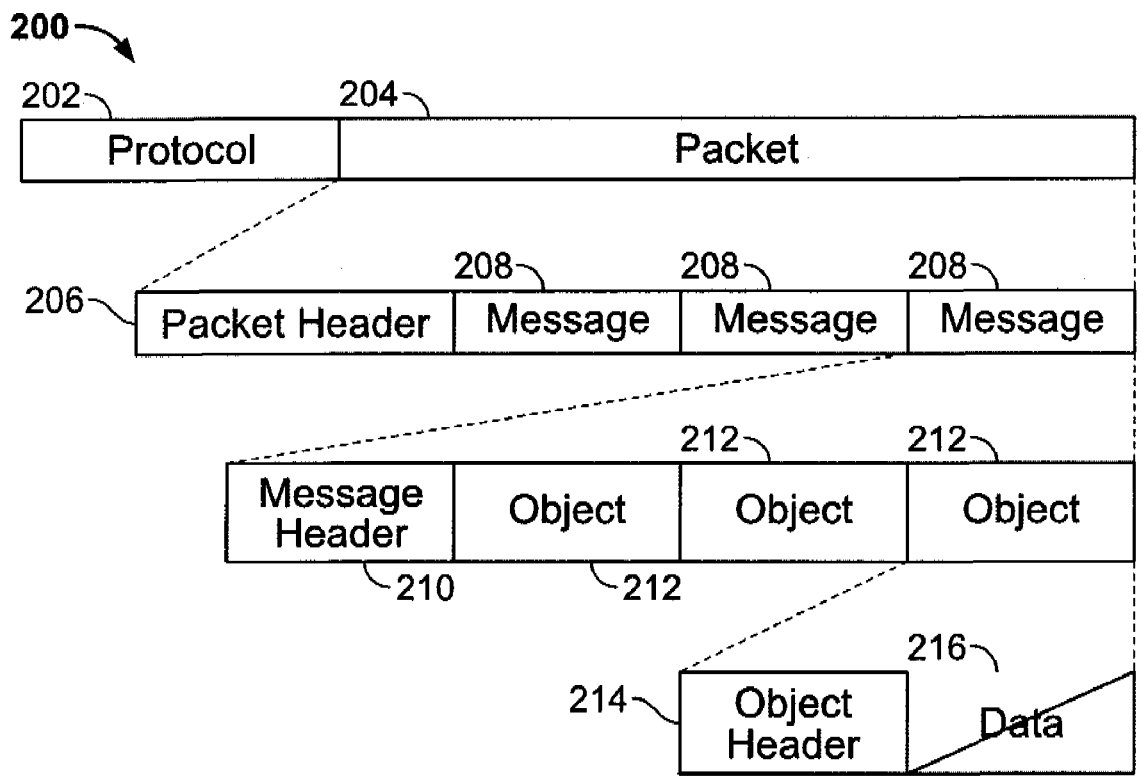
FIG. 2 is a block diagram of the format of a configuration and control message packet that may be used with the data acquisition system shown in FIG. 1.

FIG. 2 is a block diagram of the format of a configuration and control message packet 200 that may be used with data acquisition system 100 (shown in FIG. 1). During operation of 100, a detailed description of the electrical hardware and data display parameters are defined prior to actual data acquisition by data acquisition system 100. In at least some known prior art systems (not shown), such configuration parameters are defined prior to data acquisition, and then remain constant for the duration of data acquisition. In the exemplary embodiment, data acquisition system 100 permits on-the-fly configuration such that configurations of each of data source elements 108 can be changed during data acquisition and display to facilitate quick and efficient interpretation of the data. In known systems, if changes are made to configuration parameters it is difficult to correlate acquired data to the set of configuration parameters used while the data was acquired. Additionally, known configuration and control interfaces do not support individual parameters to be modified. As described herein, individual configuration parameters that control the acquisition of data by data source elements 108 are selectably individually changeable and substantially eliminate the need to correlate configuration parameters that can change on-the-fly to specific units of data. The configuration parameters used by each data source element 108 at the time of the acquisition of data is included in the message packet containing the acquired data. Transmitting the acquired data and the configuration parameters used at the time of data acquisition in the same message packet permits the data to be quickly interpreted without referencing an external database to obtain configuration information. The configuration information is used to correctly interpret the data. In known data acquisition systems, for on-the-fly parameters, before a packet of data can be interpreted, its associated configuration parameters are fetched from a configuration database, which increases the processing requirements of the system and/or slows down the system capability to a greater extent than interpreting the actual data.

In the exemplary embodiment, a configuration and control protocol is used that is flexible to allow single or multiple configuration parameters to be changed using a single configuration packet such that on-the-fly configuration changes are supported. A message can be comprised of any number of objects. In the exemplary embodiment, an individual object contains an individual configuration parameter. Because of this a single or any number of configuration parameters can be supplied to any input card 108 at any time. Additionally, to mark a beginning of a configuration sequence and an end of a configuration sequence, multiple messages are bundled together in a packet. By bundling the messages together special enter configuration and exit configuration tokens do not need to be passed from system component to component.

Configuration and control message packet 200 includes a protocol field 202 is used to identify the protocol used with the message packet. Various protocol types are configurable and future protocols may be generated without affecting existing protocols. A packet 204 includes a packet header 206 and one or more messages 208. Packet header 206 supports providing the entire configuration of any input card 108 using a single configuration packet. A message header 210 includes a message ID field that identifies the operation, a message overall length field that identifies the length of entire message, including the message header, and an operator such as a set operator, a get operator, a response, and a trap. A trap is an unsolicited event or message that informs the SBC of asynchronous events. Each object 212 included in a message 208 includes an object header 214. Object header 214 includes an object identifier (OID) and a length field that describes an overall length of object 212. Each object also includes a data field 216 that includes the individual configuration parameters.

Figure 3:
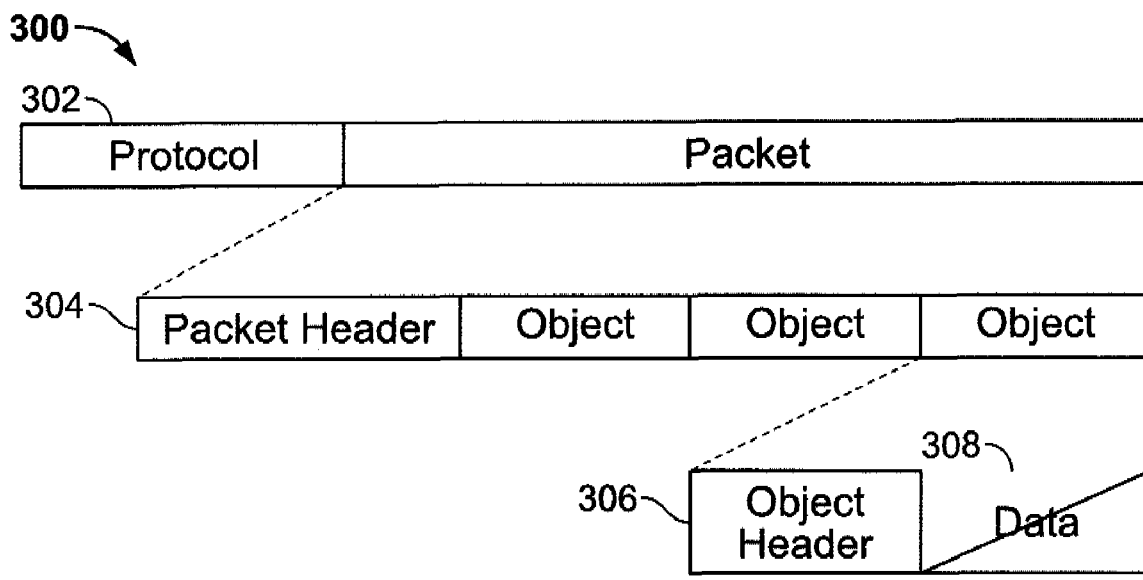
FIG. 3 is a block diagram of the format of a data packet that may be used with the data acquisition system shown in FIG. 1.

FIG. 3 is a block diagram of the format of a data packet 300 that may be used with data acquisition system 100 (shown in FIG. 1). In the exemplary embodiment, data packets 300 are similar to configuration and control packets, in that at the lowest layer they contain objects. However data packet objects are different from configuration and control objects in that they contain data as well as all the configuration parameters that can change on-the-fly for a specific data object type. Data packet 300 includes a protocol field 302 that is used to identify the protocol. A packet header 304 includes a packet overall length field that describes the overall length of the packet, including packet header 304 and a time sync index that points software to the correct time offset index within a data base.

An object header 306 includes an object identifier (OID), and an identifier that varies for a given object type. For example, for some objects the identifier indicates physical channel, for others a group ID. For some objects the identifier is not used. A cause field indicates why a sample was taken and if the data is pre-trigger or post trigger. In the case of an event notification the cause field is used by firmware to indicate to the system computer if the group has transitioned in or out of the triggered state. The cause field is used to indicate the reason why the data was collected such as due to an amplitude event, delta time event, rpm event, or some other external event. A length filed describes the overall length of the object including the header in bytes. A data field 308 includes both acquired data and all the configuration parameters that can change on-the-fly for the specific object type.

Figure 4:
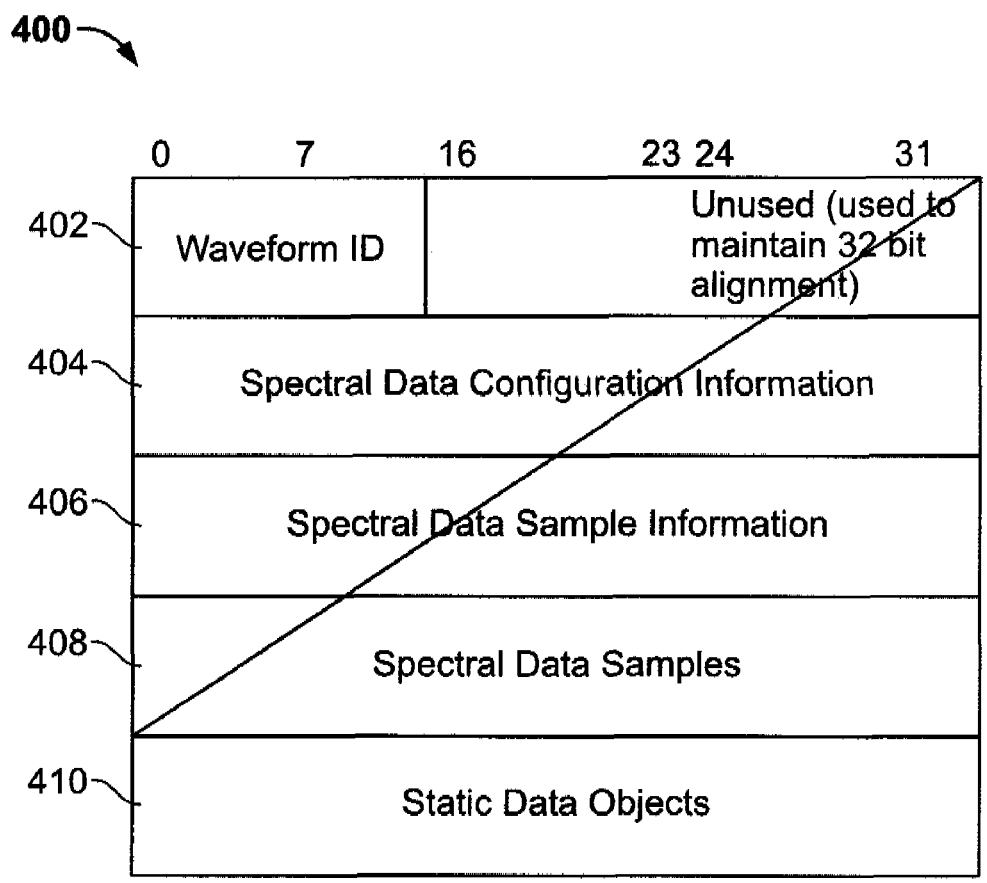
FIG. 4 is a block diagram of the format of a data packet object that may be used with the data packet shown in FIG. 3.

FIG. 4 is a block diagram of the format of a data packet object 400 that may be used with data packet 300 (shown in FIG. 3). In the exemplary embodiment, configuration parameters are combined with the acquired data by including the configuration parameters that can change on-the-fly with the actual data that is acquired. By combining the acquired data with the configuration parameters that can change on-the-fly, the system interpreting the data does not need to refer to an external configuration data base. Limiting references to an external database decreases the loading on data acquisition system 100 by allowing the system component interpreting the data to exclusively dedicate its resources to interpreting the data and not communicating with an external configuration data base. In the exemplary embodiment, data packet object 400 comprises a spectral data object that includes a waveform id field and a spectral data configuration field 404. Information contained in spectral data configuration field 404 includes transducer scale factor, transducer full scale range, signal gain, reference direction, transducer orientation angle and direction, shaft rotational direction, number of waveforms to average, begin frequency, and end frequency. The configuration information can be changed on-the-fly and is used by software to determine how to display the data.

A spectral data sample information field 406 includes, for example, a number samples that describes the number of raw samples included in the object. A time stamp is generated by a high resolution, 100 microsecond (µs) resolution hardware timer that indicates when the first sample was acquired. A data type field describes the type of sampling used, for example, asynchronous, synchronous, true zoom asynchronous, or true zoom synchronous. A spectral data samples field 408 includes the acquired data described in for example, an unsigned 16 bit value.

A static data object field 408 includes the acquired data configuration. In the exemplary embodiment, the following information is included:

| Field | Description |
| --- | --- |
| Transducer Scale Factor | Can be changed on the fly and is used by software to determine how to display the data. Range of values 0.05 [V] to 0.6 [V] 0.16 format, value/2**16. |
| Transducer Full Scale Range | Can be changed on the fly and is used by software to determine how to display the data |
| Signal Gain | Can be changed on the fly and is used by software |

-continued

| Field | Description |
|---|---|
| | to determine how to display the data. x1, x5, x10 or x20 ... |
| Slope (filter) | Number polls for band pass filter |
| 1X Bandwidth Filter | The width of the filter will stay the same, however |
| 2X Bandwidth Filter | it's center frequency change depending on the |
| Bandwidth Filter_0 (nX) | speed of the machine. |
| Bandwidth Filter_1 (nX) | |
| Bandwidth Filter_2 (nX) | |
| Bandwidth Filter_3 (nX) | |
| Center Frequency_0 (nX) | The center frequency will move with the |
| Center Frequency_1 (nX) | synchronous speed of the machine. |
| Center Frequency_2 (nX) | 16.16 Format. |
| Center Frequency_3 (nX) | The first 16 bits are used for the whole number the second 16 bits are used for the fractional portion of the number. |
| Corner Frequency (Low Pass) | Channel low pass filter corner |
| Corner Frequency (High Pass) | Channel high pass filter corner |
| Integrated | Indicates what type of integration this channel is to perform, if any. |
| Mode | Indicates the sampling mode |
| Reference Direction | Echoed back to SBC, used for forward and reverse vector calculations |
| Shaft Rotational Direction | Echoed back to SBC, used for forward and reverse vector calculations |
| Transducer Orientation Angle and Direction | Echoed back to the SBC, used for forward and reverse vector calculations |
| Units | Echoed back to the SBC, used to indicate units (pressure, distance, velocity etc) |

The above-described on-the-fly configuration method is cost-effective and highly reliable. The method permits configurations to be changed "during" data acquisition and display and also permits the data to be quickly and efficiently interpreted and individual parameters to be changed individually such that correlating configuration parameters that can change on-the-fly to specific units of data is performed using configuration information contained in each message packet. Accordingly, the on-the-fly configuration method facilitates the interpretation of acquired data in a cost-effective and reliable manner.

While the invention has been described in terms of various specific embodiments, those skilled in the art will recognize that the invention can be practiced with modification within the spirit and scope of the claims.

What is claimed is:

1. A method of transmitting data between elements of a data acquisition system, said method comprising:
   receiving, at a first element via a bus of the data acquisition system, a self-describing control packet including a first configuration parameter, the first configuration parameter controls first data acquisition by the first element;
   acquiring first data by the first element in accordance with the first configuration parameter;
   generating a self-describing data packet including an identifier for the first configuration parameter and the acquired first data;
   interpreting the acquired first data using the identifier; and
   displaying the acquired first data.

2. A method in accordance with claim 1 further comprising:
   transmitting the self-describing data packet to a second element; and
   interpreting the data contained in the data packet using the identifier in the data packet at the second element.

3. A method in accordance with claim 1 further comprising:
   receiving a second configuration parameter in a self-describing control packet during the data acquisition;
   acquiring second data by the first element in accordance with the second configuration parameter; and
   generating a self-describing data packet that includes an identifier for the first configuration parameter, an identifier for the second configuration parameter, the first acquired data, and the second acquired data such that the first and second acquired data is interpretable using the first and second identifiers, respectively.

4. A method in accordance with claim 1 further comprising:
   receiving configuration parameter information from at least one of a user at an interface element arid a software generated rule; and
   generating a control packet at the interface element, the control packet including the received parameter information.

5. A method in accordance with claim 4 wherein receiving configuration parameter information comprises receiving configuration parameter information that includes at least one of a transducer scale factor, a transducer full scale range, transducer signal filter parameters, gain value parameters, a sampling mode, a reference direction, a shaft rotation direction, signal integration parameters, and a transducer orientation angle and direction.

6. A method in accordance with claim 4 wherein generating a control packet at the interface element comprises generating a control packet wherein the transducer signal filter parameters include at least one of a filtering type, a filter bandwidth, a filter slope, a center frequency, and a corner frequency.

7. A method in accordance with claim 1 wherein generating a self-describing data packet comprises generating a self-describing data packet that includes at least one of raw data that is substantially unprocessed by the receiving element and data that is processed by the receiving element.

8. A method in accordance with claim 1 further comprising outputting the interpreted the acquired first data using the first configuration parameter.

9. A data acquisition system comprising:
an interface element configured to receive first configuration parameter information via a bus of the data acquisition system from at least one of a user at said interface element and a software generated rule, said interface element further configured to generate a self-describing control packet including the received first configuration parameter information;
a first element configured to receive the self-describing control packet and to control acquisition of first data by the first element using the first configuration parameter information;
a second element configured to interpret the acquired first data using the first configuration parameter information; and
a display element configured to display the acquired first data.

10. A system in accordance with claim 9 wherein said first element is further configured to generate a self-describing data packet including the first configuration parameter information and the acquired first data.

11. A system in accordance with claim 9 wherein said first element is further configured to transmit the self-describing data packet to a second element.

12. A system in accordance with claim 9 wherein said second element is further configured to receive the self-describing data packet including the first data and the first configuration parameter information.

13. A system in accordance with claim 9 wherein said interface element is configured to receive second configuration parameter information from at least one of the user at said interface element and the software generated rule, said interface element further configured to generate a second self-describing control packet including the received second configuration parameter information.

14. A system in accordance with claim 13 wherein said first element is configured to receive the second self-describing control packet and to control acquisition of second data by the first element using the second configuration parameter information.

15. A system in accordance with claim 14 wherein said first element is configured to generate a self-describing data packet tat includes an the first configuration parameter information, the second configuration parameter information, the first acquired data, and the second acquired data such that the first and second acquired data is interpretable using the first and second configuration parameter information respectively.

16. A system in accordance with claim 15 wherein said second element is configured to interpret the first acquired data, and the second acquired data using the first and second configuration parameter information respectively.

17. A computer program embodied on a computer readable storage medium for controlling data acquisition on a machine, said program comprising a code segment that controls a data acquisition system to:
receive, at a first element via a bus of the data acquisition system, a self-describing control packet including a first configuration parameter, the first configuration parameter controls first data acquisition by the first element;
acquire first data by the first element in accordance with the first configuration parameter;
generate a self-describing data packet including an identifier for the first configuration parameter and the acquired first data;
interpret the acquired first data using the identifier; and
display the acquired first data.

18. A computer program in accordance with claim 17 further configured to:
transmit the self-describing data packet to a second element; and
interpret the data contained in the data packet using the identifier in the data packet at the second element.

19. A computer program in accordance with claim 17 further configured to:
acquire second data by the first element in accordance with the second configuration parameter; and
generate a self-describing data packet that includes an identifier for the first configuration parameter, an identifier for the second configuration parameter, the first acquired data, and the second acquired data such that the first and second acquired data is interpretable using the first and second identifiers, respectively.

20. A computer program in accordance with claim 17 further configured to:
receive configuration parameter information from at least one of a user at an interface element and a software generated rule wherein the configuration parameter information includes at least one of a transducer scale factor, a transducer full scale range, transducer signal filter parameters, gain value parameters, a sampling mode, a reference direction, a shaft rotation direction, signal integration parameters, and a transducer orientation angle and direction and wherein the transducer signal filter parameters include at least one of a filtering type, a filter bandwidth, a filter slope, a center frequency, and a corner frequency; and
generate a control packet at the interface element, the control packet including the received parameter information.

* * * * *

UNITED STATES PATENT AND TRADEMARK OFFICE
CERTIFICATE OF CORRECTION

PATENT NO. : 7,613,840 B2  Page 1 of 1
APPLICATION NO. : 11/465153
DATED : November 3, 2009
INVENTOR(S) : Brockhage et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 546 days.

Signed and Sealed this

Nineteenth Day of October, 2010

David J. Kappos
*Director of the United States Patent and Trademark Office*